(12) United States Patent
Nuss et al.

(10) Patent No.: US 10,821,866 B2
(45) Date of Patent: Nov. 3, 2020

(54) HEADREST

(71) Applicant: GRAMMER AG, Amberg (DE)

(72) Inventors: Ralph Nuss, Poppenricht (DE);
Gerhard Delling, Schmidgaden (DE);
Manuel Boesl, Freudenberg (DE);
Erwin Himmelhuber,
Sulzbach-Rosenberg (DE); Hubert Keller, Kuemmersbruck (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 16/281,890

(22) Filed: Feb. 21, 2019

(65) Prior Publication Data

US 2019/0322200 A1   Oct. 24, 2019

(30) Foreign Application Priority Data

Mar. 21, 2018 (DE) .......................... 10 2018 106 698

(51) Int. Cl.
*B60N 2/806* (2018.01)
*B60N 2/891* (2018.01)

(52) U.S. Cl.
CPC ............. *B60N 2/806* (2018.02); *B60N 2/891* (2018.02)

(58) Field of Classification Search
CPC ......... B60N 2/806; B60N 2/865; B60N 2/891
See application file for complete search history.

(56) References Cited

U.S. PATENT DOCUMENTS

| 4,733,913 | A  | * | 3/1988  | Tateyama .............. | B60N 2/847 297/409 |
| 6,688,697 | B2 | * | 2/2004  | Baumann .............. | B60N 2/865 297/391 |
| 7,520,564 | B2 | * | 4/2009  | Woerner ............... | B60N 2/865 297/216.12 |
| 8,616,633 | B2 | * | 12/2013 | Truckenbrodt ........ | B60N 2/865 297/216.12 |
| 8,662,592 | B2 |   | 3/2014  | Keller                 |         |

(Continued)

FOREIGN PATENT DOCUMENTS

DE   102017007149 A    1/2019

*Primary Examiner* — Philip F Gabler
(74) *Attorney, Agent, or Firm* — Andrew Wilford

(57) ABSTRACT

The invention relates to a headrest, in particular for a vehicle seat, with a head contact part (11), with a support (12) for mounting the headrest (10) on a fixed structure, with at least one parallelogrammatic linkage (23) between the head contact part (11) and the support (12) that carries the head contact part (11) for movement relative to the support (12) between a first position and a second position, wherein the parallelogrammatic linkage (23) comprises at least two links (16, 17), and each link (16, 17) forms at least one pivot joint (G1A, G2A, G1C, G2C) with the support (12) and at least one pivot joint (G1B, G2B, G1D, G2D) with the head contact part (11), with a latch (19), with a first latch formation on the support (12) and a second latch formation on the head contact part (11), wherein the first latch formation and the second latch formation are in engagement in a locked position and are disengaged in a release position. The special feature is that the first latch formation is fixed on the support (12) or that an upper region of at least one link (116) is provided with the first latch formation, and that the second latch formation is fixed on the head contact part (11).

8 Claims, 6 Drawing Sheets

(56) References Cited

U.S. PATENT DOCUMENTS

Figure 1:
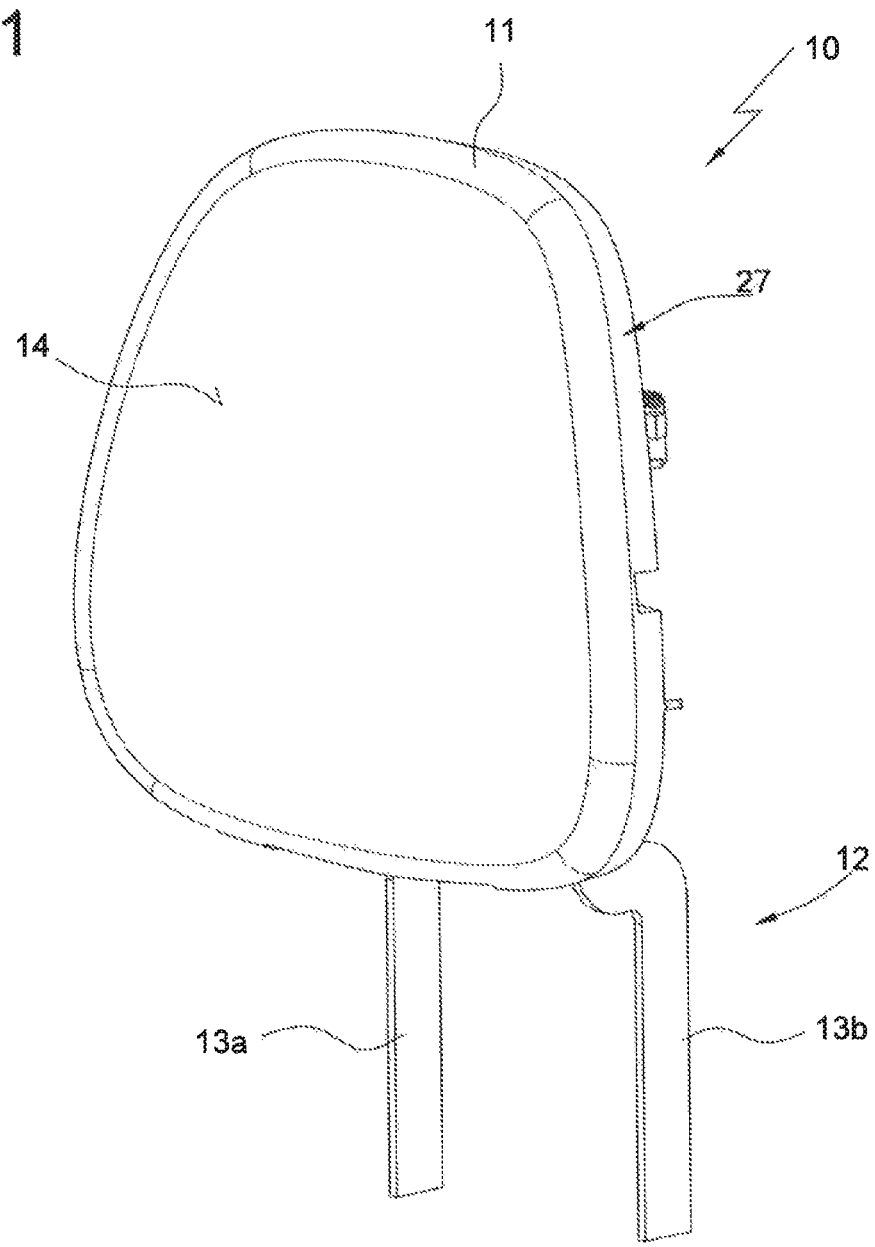

| | | | |
|---|---|---|---|
| 8,746,800 B2* | 6/2014 | Reel | B60N 2/865 297/410 |
| 9,566,884 B2* | 2/2017 | Line | B60N 2/865 |
| 9,878,645 B2* | 1/2018 | Kim | B60N 2/0232 |
| 2014/0197671 A1* | 7/2014 | Frotz | B60N 2/865 297/391 |

* cited by examiner

HEADREST

The invention relates to a headrest, in particular for a vehicle seat, having a parallelogrammatic linkage.

Such a headrest is known from DE 10 2010 007 942 [U.S. Pat. No. 8,662,592]. The headrest comprises a support carrying a head contact part on a vehicle seat. A parallelogrammatic linkage is between the head contact part and the support and allows the head contact part to move between a front position and a rear position.

The head contact part can be locked in different positions in the movement between the front position and the rear position. For this purpose, the links of the parallelogrammatic linkage are of circular-segment design and have teeth on an end region so that a lever pivotal on the support, can be form-fittingly and releasably cam be engaged in order to lock the head contact part.

The object of the invention was to provide a headrest with a parallelogrammatic linkage that requires little construction space and which, when viewed laterally, has an optically narrow design, in particular in the area of the support.

The object is achieved by a headrest having the features of claim 1.

The headrest is provided for a seat, in particular for a vehicle seat. It is equipped with a head contact part as well as with a support for mounting the headrest on a structure of the vehicle. The structure of the vehicle can for example be a vehicle seat, in particular the backrest of a vehicle seat. A support can be any structure, with which a fastening to the vehicle structure is possible. The headrest comprises at least one parallelogrammatic linkage between the head contact part and the support that carries the head contact part for movement relative to the support between a first position and a second position.

The parallelogrammatic linkage comprises at least two links, wherein each link forms at least one pivot joint with the support and at least one pivot joint with the head contact part. Furthermore, the headrest comprises at least one latch that is provided with a first latch formation on the support as well as with a second latch formation on the head contact part.

The first latch formation is fixed on the support or, according to an alternative, an upper region of at least one link is provided with the first latch formation. The second latch formation is fixed on the head contact part.

The support comprises for example at least one support bar or one support bar bracket. The support bar does not have to be a rod in the conventional sense, it can likewise be a metal sheet in the context of the invention, for example. The support can for example include a U-shaped metal sheet with free end regions. Links of the parallelogrammatic linkage are articulated on the end regions, for example. The metal sheet is for example mounted in at least one support bar or on a support bar bracket, wherein the support bar or the support bar bracket can be mounted on the backrest. The metal sheet can for example also be held directly on the backrest. Alternatively, the support can simply be formed by a base plate that can be fastened to the rest structure. The support forms the first latch formation, for example.

The head contact part includes a holder, for example. The holder forms for example the pivot joints between the links of the parallelogrammatic linkage and the head contact part. The holder is connected integrally with a head contact part plate, for example, or is formed as a separate component. In the latter case, the head contact part plate can be moveable relative to the holder. The holder receives for example part of the latch.

According to one embodiment, the support comprises at least one projection extending beyond the pivot joints on the side of the head contact part. The projection can be formed by a support bar or a support bar bracket, for example. The projection extends for example from the support approximately vertically. These features allow the first latch formation to be formed adjacent the second latch formation. No large path between the first latch formation and the second latch formation must be overcome in order to move them between the locked position and the release position.

The first latch formation is on the projection, for example. The projection forms the first latch formation, for example. The first latch formation is formed by a region of the projection, for example, or by an element fastened to the projection.

The second latch formation comprises for example at least one lock element which is displaceable between the locked position and the release position. The lock element can for example have the shape of at least one projection that engages into a recess of the first latch formation, or include at least one recess that can be form-fittingly releasably moved into engagement with a structure of the first latch formation.

The at least one lock element is for example formed by at least one toothed rack that is provided with at least one recess. In this case, one of the recesses can selectively be moveable releasably in engagement with the first latch formation, for example with a region of a projection of the support that forms the first latch formation.

According to one embodiment, the toothed rack is essentially displaceable in an essentially horizontal plane between the locked position and the release position, in order to move the latch between the locked position and the release position.

For example, the first latch formation is formed by two projections included on the support, and the second latch formation is formed by two toothed racks mounted on the head contact part.

The toothed rack is formed by another lock element, for example. This lock element is displaceable in a straight line, for example.

According to one embodiment, the lock elements are biased into the locked position by a spring, and can be moved to the release position against the force of the spring.

The latch is adjacent the pivot joints of the parallelogrammatic linkage on the side of the head contact part, for example. These features reduce the lever forces acting on the support. For example, the latch, in particular the second latch formation, is above the pivot joints of the parallelogrammatic linkage on the side of the head contact part.

In addition to the horizontal adjustment of the head contact part, the headrest comprises for example an adjustment means for vertical adjustment of the entire head contact part, or of part of the head contact part.

The vertical adjustment of the headrest can be configured corresponding to the headrest on accordance with DE 10 2017 007 149 A1, for example, the disclose of which is incorporated in this application in its entirety.

Figure 2:
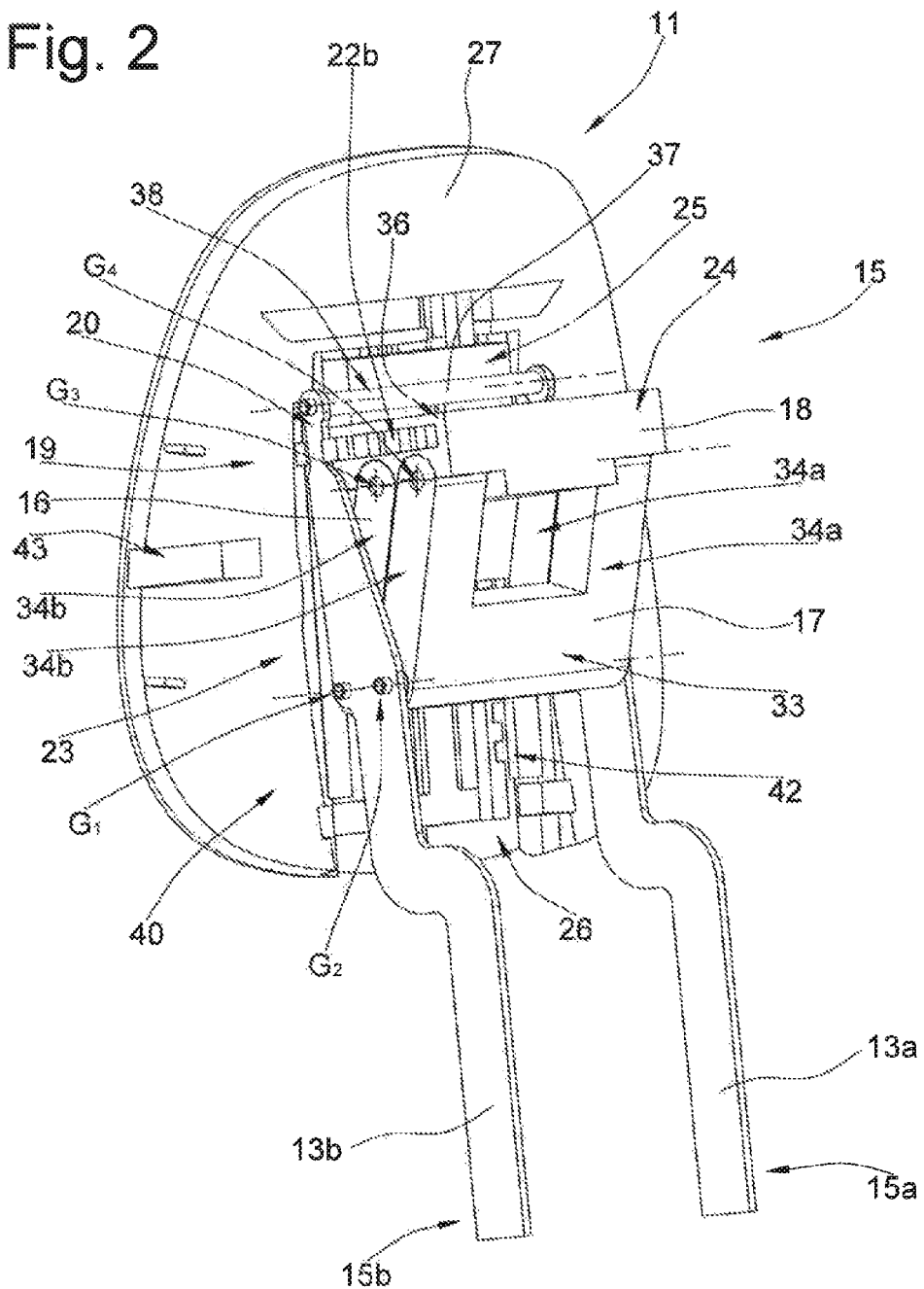
Figure 3:
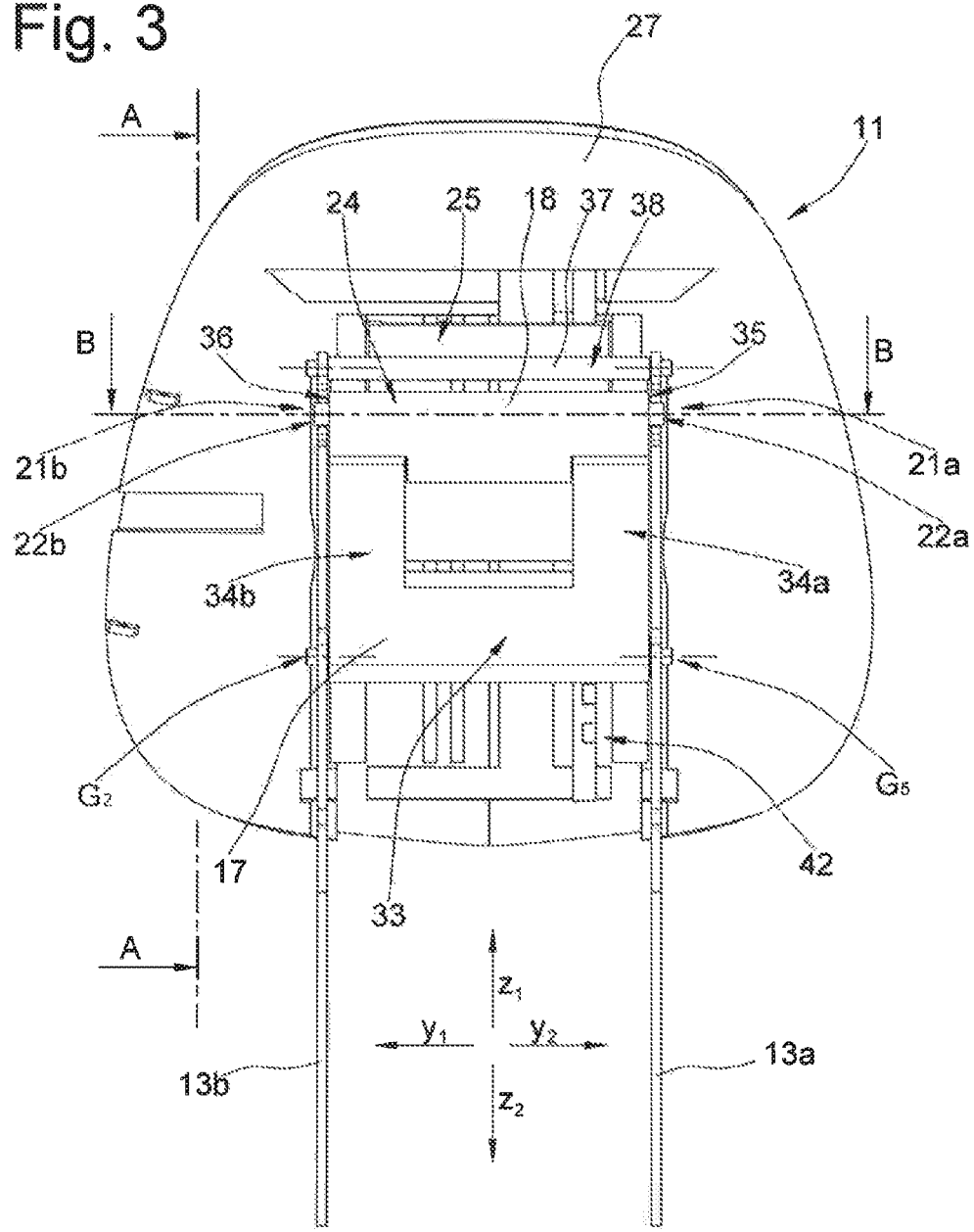
Figure 4:
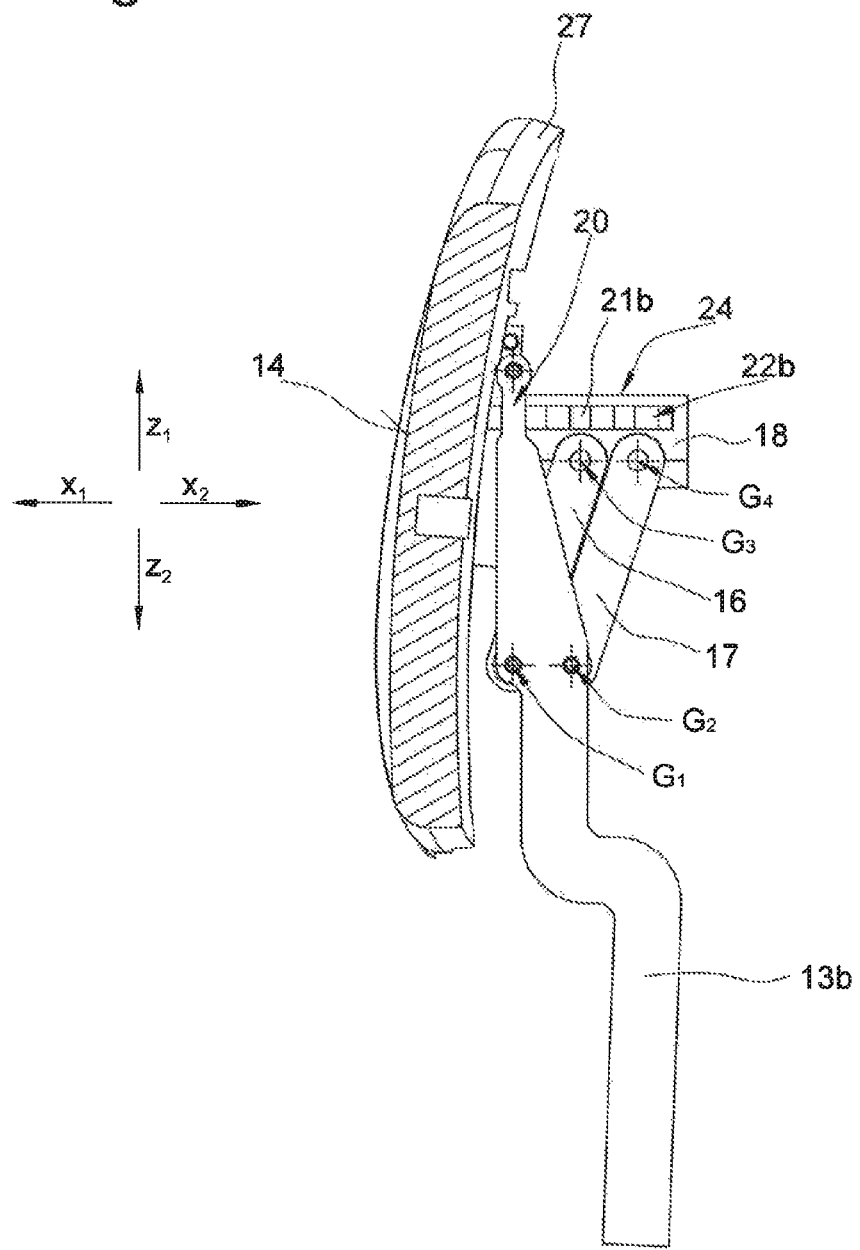
Figure 5:
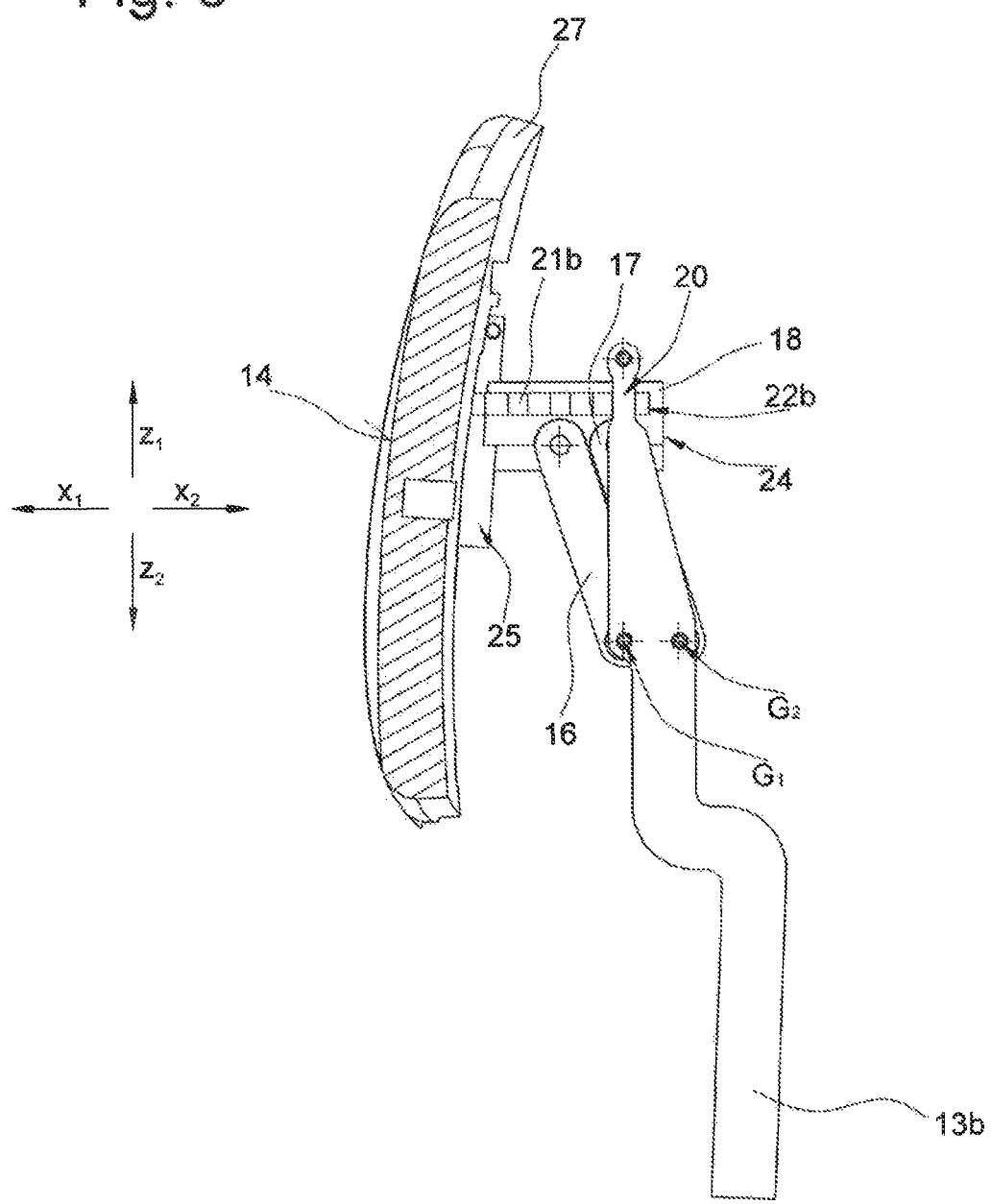
Figure 6:
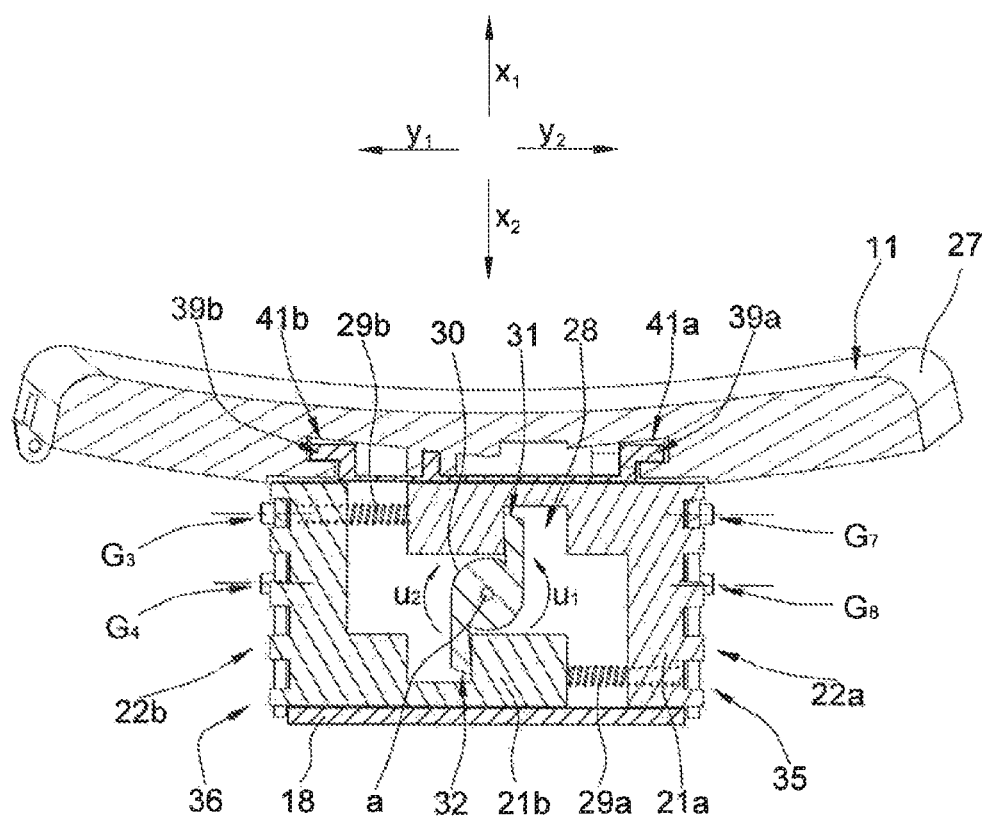

Further advantages result from an embodiment schematically illustrated in the drawing. The figures show in:

FIG. 1 a perspective view of the headrest from the front, wherein a head contact part is located in the rear position;

FIG. 2 a perspective view of the headrest according to FIG. 1 from the rear;

FIG. 3 a rear view of the headrest according to FIG. 1;

FIG. 4 a sectional view according to section line A-A in FIG. 3;

FIG. 5 a sectional view like FIG. 4 with the head contact part in the second position;

FIG. 6 a sectional view according to the section line B-B in FIG. 3.

A headrest of a vehicle seat as a whole is denoted by reference character 10 throughout the drawing. Like reference characters in the different figures denote corresponding parts, even though small letters are added or omitted.

A perspective view of the headrest 10 is shown in FIG. 1. The headrest 10 includes a head contact part 11 as well as a support 12 formed by two support bars 13a and 13b in the present embodiment. The head contact part 11 includes a head contact part plate 27 as well as a holder 18 that is a distinct component in the present embodiment, but alternatively can be integrally connected with the head contact part plate 27. The support bars 13a and 13b are fixedly connected, for stabilization, with a bar 37 to a support bar bracket 38 that is part of the support 12. The head contact part 11 comprises a head contact surface 14 that forms a counter-bearing for the head of the person seated on the seat.

Lower ends 15a and 15b of the support bars 13a and 13b are for example fastenable on the structure backrest of a seat (not illustrated). The head contact part 11 is adjustable to different positions by an adjuster 40. The adjuster 40 includes a parallelogrammatic linkage device 23 with two links 16 and 17. Each of the links 16 and 17 comprises arms 34a and 34b as well as a traverse 33 that connects the arms 34a and 34b. The traverse 33 essentially serves to improve the stability in the embodiment. However, the traverse 33, as a connection of the arms 34a and 34b, could alternatively likewise be dispensed with.

The link 16 forms a pivot joint $G_1$ (see FIG. 2) together with the support bar 13b, and the link 17 forms a pivot joint $G_2$ together with the support bar 13b. The link 16, in particular the arm 34b of the link 16, moreover forms a pivot joint $G_3$ with the head contact part 11, in the present case with a lateral region 35 of the holder 18 of the head contact part 11, while the link 17, in particular the arm 34b of the link 17, forms a pivot joint $G_4$ together with the lateral region 35 of the holder 18.

In the same way, the links 16 and 17 each form a pivot joint with the support bar 13a on a lateral region 36 opposite the lateral region 35, and, furthermore, respectively form a pivot joint with the holder 18, which is not discernable in FIG. 2.

In this way, the head contact part 11 is displaceable relative to the support 12 between a rear position (see FIGS. 2 to 4) and a front position (see FIG. 5) by a parallelogrammatic linkage 23 that includes the support bar bracket 38, the links 16 and 17 as well as the head contact part 11 with the holder 18 in the directions $x_1$ and x2, wherein the head contact part 11 conducts a curve movement with components of a movement in the Z direction and components of a movement in the X direction.

The adjuster 40 comprises a latch 19 that can arrest the head contact part 11 in the rear position or the front position or in a position between the rear position and the front position. The latch 19 comprises first latch formation on the head contact part 11, and a second latch formation on the support bars 13a and 13b that can be brought into engagement in a releasable manner.

In the present case, the support bars 13a and 13b are extended beyond the pivot joints $G_1$ and $G_2$, in particular beyond the pivot joints $G_3$ and $G_4$, in the direction z1, and are provided with the second latch formation in the form of a locking region 20. The locking region 20 is, in the present embodiment, directly formed by the support bars 13a and 13b. The first latch formation is configured in the form of two lock elements 21a and 21b that are relatively moveable to the holder 18, and are respectively provided with a toothed structure 22a and 22b, for example in this embodiment in the form of a toothed rack. Merely the toothed structure 22b is discernable in FIG. 2.

It is also discernable in FIG. 2 that the latch 19 is in a locked position, i.e. that the toothed structure 22b is in engagement with the locking region 20, so that the head contact part 11 is not moveable between the rear and the front position.

The articulated connection between the link 17 and the support bar 13a in the form of a pivot joint $G_5$ is discernable in FIG. 3.

A rear region 24 of the holder 18 includes the toothed structures 22a and 22b that essentially extend in the X-direction. A front region 25 is provided with a guide device 26, in order to moveably support the head contact part plate 27 in the direction $z_1$ and $z_2$ between an upper position and a lower position. The head contact part plate 27 can be arrested, using an arresting device, in the upper position, the lower position and in intermediate positions between the upper position and the lower position.

According to FIG. 4, the head contact part 11 is locked in the rear position by the latch 23. FIG. 5 shows the head contact part 11 in the front position.

FIG. 6 shows a sectional view, wherein the lock elements 21a and 21b are discernable. The lock elements 21a and 21b are moveably mounted in the receiving space 28 of the holder 18. A spring 29a loads the lock element 21a in the direction $y_2$ into the locked position, and a spring 29b loads the lock element 21b in direction $y_1$ into the locked position.

An actuation element 30 is mounted to be pivotable around an axis a in the directions $u_1$ and u2. The actuation element 30 can be actuated from outside on the headrest 10 with a button 43 (merely shown in FIG. 2), or alternatively or additionally electrically with a motor. The actuation element 30 comprises two arms 31 and 32. The arm 31 is in contact with the lock element 21a, and the arm 32 is in contact with the lock element 21b.

In the basic position of the actuation element 30, illustrated in FIG. 6, the lock elements 21a and 21b are in the locked position. If the actuation element 30 is pivoted in the direction u1, the arm 31 displaces the lock element 21a against the force of the spring 29a in the direction y1, and the arm 32 displaces the lock element 21b against the force of the spring 29b in the direction $y_2$ into the release position. In the release position, the lock element 21a is disengaged from the locking region 20a, and the lock element 21b is disengaged from the locking region 20b. In the release position, the head contact part 11 can be moved between the rear position and the front position.

If the actuation element 30 is relieved, the spring moves the lock element 21a in the direction y2, and the spring 29a moves the lock element 21b in the direction $y_1$ into the locked position in engagement with the respective locking region 20a and 20b. In doing so, the actuation element 30 is moved back in the direction $u_2$ into the basic position by the lock elements 21a and 21b.

Hook-shaped projections 39a and 39b are discernable in FIG. 6, which are formed on the front region 25 of the holder 18. In the head contact part plate 27, grooves 41a and 41b are formed. The projection 39a engages into the groove 41a, and the projection 39b engages into the groove 41b, in order to moveably guide the head contact part plate 27 relative to the holder in the direction $z_1$ and z2. The projections 39a and 39b as well as the grooves 41a and 41b are part of the guide device 26. In FIGS. 2 and 3, a toothed rack 42 is discernable as a part of the arresting device, with which a non-illustrated lock, mounted on the holder 18 can be releasably brought into engagement, in order to arrest the head contact part plate 27 in different height positions.

The invention claimed is:

1. A headrest comprising:
   a head contact part;
   a support carrying the head contact part on a fixed structure;
   at least one linkage between the head contact part and the support and carrying the head contact part for movement horizontally relative to the support between a first position and a second position horizontally offset therefrom, the linkage including at least two links that each form at least one pivot joint with the support and at least one pivot joint with the head contact part;
   a latch including a pair of first latch formations fixed on and projecting upward from the support and respective second latch formations secured on the head contact part between and juxtaposed with the respective first latch formations and each movable relative to the respective second latch formation between
      a locked position engaged with the respective second latch formation and blocking relative movement of the head contact part relative to the support between the first and second positions and
      a release position disengaged from the respective second latch formation and allowing such relative movement of the head contact part relative to the support; and
   an actuation element on the head contact part displaceable to displace the second lock formations between the respective locked positions and the respective release positions.

2. The headrest according to claim 1, wherein the support comprises at least one support bar or support bar bracket.

3. The headrest according to claim 1, wherein the second latch formation comprises at least one lock element displaceable between the locked position and the release position.

4. The headrest according claim 3, wherein the at least one lock element is formed by a toothed rack that is provided with at least one recess.

5. The headrest according to claim 4, wherein the toothed rack structure is displaceable essentially horizontally between the locked position and the release position.

6. The headrest according to claim 5, wherein the support comprises two projections, and two parallel respective toothed racks are provided.

7. The headrest according to claim claim 6, wherein the toothed racks are adjacent the pivot joints of the linkage on the side of the head contact part.

8. The headrest according to claim 1, wherein the head contact part comprises an adjuster for vertical adjustment of the head contact part or part of the head contact part.

* * * * *